United States Patent [19] [11] 3,838,462
Barbeau et al. [45] Sept. 24, 1974

[54] PARTITIONABLE DISC MEMORY WITH FLEXIBLE DISCS AND CONFORMALLY SUSPENDED HEAD

[75] Inventors: Raymond A. Barbeau; Bernard W. McGinnis, both of Poughkeepsie; Anthony W. Orlando, Highland; James A. Weidenhammer, Poughkeepsie, all of N.Y.

[73] Assignee: International Business Machines Corporation, Armonk, N.Y.

[22] Filed: July 2, 1973

[21] Appl. No.: 375,989

[52] U.S. Cl. .................... 360/99
[51] Int. Cl. .................... G11b 15/00
[58] Field of Search .................... 360/99

[56] References Cited

UNITED STATES PATENTS

| | | | |
|---|---|---|---|
| 3,537,083 | 10/1970 | Voth | 340/174.1 E |
| 3,618,055 | 11/1971 | Van Acker et al. | 340/174.1 E |
| 3,731,292 | 5/1973 | Kelley | 340/174.1 E |

*Primary Examiner*—Vincent P. Canney
*Attorney, Agent, or Firm*—Robert Lieber

[57] ABSTRACT

Normally confined record surfaces of ultra-thin continuously rotating flexible magnetic record discs (nominal thickness 0.0017 inches), arranged in a laminar configuration of several hundred aggregately deformable discs, are accessed by aerodynamically stabilized flexure. The rotational path is partitioned by an axially translated airfoil blade at axial interface positions between randomly selected discs, and a semirigidly suspended contoured head is positioned independently of the partitioning blade in compliant relation to the surface of revolution traced by a disc surface at the interface. That surface conforms intimately to the convex head contour, separated from the head only by a very thin hydrodynamically generated air film. The arrangement thus provides high lineal density of bit recording. Tendency of the partitioned discs to flutter during the partitioning action and thereby potentially interfere with or delay positioning of the head, is counteracted by specific design features of the disclosed partitioning and stabilizing assemblies. The conformal position of the head is established at a peripheral zone of the interface record surface and glides radially to a selected track position of the record without interruption of the conformal relation. The aggregate assembly is characterized by volumetric efficiency (recording bit densities in excess of $10^{10}$ bits in a volume of 250 cubic inches) and access efficiency (1 sec). Plural partitioning and transducing mechanisms can be associated with a single pack; either as stand-by redundant elements or to provide access to record surfaces on opposite sides of partition interfaces. Plural packs are aggregatable on a common spindle or on separate spindles.

13 Claims, 27 Drawing Figures

(a) (b) (c)

PARTITIONABLE DISC MEMORY WITH FLEXIBLE DISCS AND CONFORMALLY SUSPENDED HEAD

CROSS REFERENCES TO RELATED APPLICATIONS

The following co-pending patent applications filed simultaneously herewith disclose related subject matter and relevant portions of their disclosures are intended to be incorporated herein by this and subsequent references.

1. Application Ser. No. 375,987, filed July 2, 1973 by R. A. Barbeau, B. W. McGinnis, and J. A. Weidenhammer, entitled "Aerodynamic Partitioning Mechanism For Random Access Memory With Flexible Rotating Discs."
2. Application Ser. No. 375,988, filed July 2, 1973 by R. A. Barbeau, B. W. McGinnis, and F. A. Schultz, entitled "Stabilization of Partitionable Memory With Flexible Rotating Discs."
3. Application Ser. No. 375,986, filed July 2, 1973 by A. W. Orlando and B. W. McGinnis, entitled "Selectively Tensioned Transducer Assembly For Operation In Compliant Relation To Individual Memory Discs Of A Partitionable Aggregate Of Rotating Flexible Discs."
4. Application Ser. No. 375,985, filed July 2, 1973 by R. O. Cobb and J. Lipp, entitled "Edge Locating Apparatus."

BACKGROUND OF THE INVENTION

1. Field of the Invention

Laminar configurations of multi-disc magnetic memories for random access mass storage; wherein normally confined record surfaces of individual flexible disc laminae are rendered randomly accessible by flexed distortion of the rotational path of a segment of the aggregate assembly at the interface formed by the selected disc; whereby an opening in the interface is formed which is suitable for accommodating a transducer over a range of recording tracks.

2. Prior Art

U. S. Pats. No. 3,509,553, 3,618,055 and 3,703,713 disclose rotating flexible magnetic disc storage configurations in which individual flexible discs of a rotating laminately structured aggregate are isolated in a guiding channel or slot of a rigidly suspended selecting mechanism shaped to deflect the paths of rotation of all other discs away from the path of rotation of the selected disc. The selecting mechanism incorporates a transducer facing the guiding channel and its movement is tailored to align the transducer with a desired track on the selected disc. In at least one of these arrangements a hydrostatic air bearing is formed by conduction of externally pressurized air through the transducer into the channel space. Factors affecting recording density and operation of such devices include the rotational impedance and potential wear hazard of the guiding channel structure relative to the discs and the aerodynamic stability of the aggregate relative to the selecting mechanism. Air currents set up by the partitioning motion would have a tendency to cause the selected (guided) disc to flutter which in turn may place severe wear stresses on the discs and also delay or impede transducing access. Also the intimacy of compliance between the head and record is limited by the channel configuration.

Lynott et al, IBM Technical Disclosure Bulletin, Volume 12, No. 1, June 1969, page 81, suggests use of separately suspended partitioning and transducing mechanisms, in similarly structured disc aggregates; one to displace the rotational path of a randomly selected segment of the aggregate and the other to perform transducing operations relative to a record surface facing the partition space between displaced and undisplaced segments. As disclosed the arrangement should require discs of substantial strength and thickness as the nearest disc of the displaced segment is shown to be deflected and guided by the partitioning mechanism near its peripohery. It should thereby tend to wear, disengage or slip away in the event of fluttering motion in the aggregate. Also lacking is disclosure of necessary means for stabilizing motion of the undeflected segment to permit unobstructed emplacementt of the head adjacent thereto. Also lacking is disclosure of means for assuring uniform and close spacing between the head and record surface as required for high density low wear recording.

U. S. Pat. No. 3,130,393 (Gutterman) discloses a laminate arrangement of coaxial discs subject to axial translation without flexure. The discs are enclosed within an air-tight shroud in a piston-like aggregate and are accessed pneumatically by means of high pressure air jets. The arrangement is quire bulky, involving orders of magnitude greater mass, volume and separation force than would be required for equivalent amounts of data storage in presently described organizations. A second piston-like arrangement serves to vary the position of the transducer assembly, ostensibly to accommodate irregularities in the recording surfaces. This arrangement however is considered less intimately conformable and less efficient than presently described transducing arrangements. It should have more severe tendency to "crash-land" or otherwise damage the records. The rigid axial translation of the entire selected segment is in contrast to the flexed axial displacement of parts of the paths of rotation in the present arrangement and in the patents first cited above.

SUMMARY OF THE PRESENT INVENTION

We have found that, with certain critically essential and innovative additions and modifications, an arrangement resembling the Lynott et al configuration referenced above can be made to function with enhanced volumetric efficiency and stability on packs of ultra-thin flexible magnetic discs such as are contemplated in the three patents first cited above. Relative to the latter the present arrangement would be expected to provide increased rotational speed (higher bit rate), reduced record flutter (shorter access time), closer head to record spacing (greater bit density) and decreased record wear.

The present partitioning mechanism thrust deeply into the pack of vertically oriented discs at the selected interface, with distinctive skewed motion deflecting the segments of discs thereby encountered. The blade is structured to form a firmly supportive and lubricative hydrodynamic air bearing relative to the deflected discs while gradually widening the opening between the deflected and undeflected discs. The mechanism includes a hollow blade having specific airfoil contours on its deflecting surface side tailored to maintain hydrodynamic air bearing support of the deflected segment while presenting low impedance to pack rotation. The contour is also tailored with varying camber to effect smooth widening of the partition space as the blade tip advances into the partition space. Air passages within the blade supply air under slight pressure to the space between discs at the selected partition interface, augmenting the flow of air within that space. This eliminates a tendency of the nearest undeflected discs to flutter during the partitioning action and thereby speeds formation of a stable partition opening configuration suitable for emplacement of the independently suspended head in transducing position relative to a record surface confronting the interface.

The magnetic head, a contoured low mass structure, is mounted on a spring arm. The arm is inserted into the partition space and biased with predetermined tension towards a disc surface confronting the interface; preferably the surface of the undeflected disc. The spring tension and contours operate within critical limits to produce a complementary conformal contour in the opposed record surface with an intervening lubricative air film of intimate dimensions. The head thereby assumes "gliding" or "flying" attitude, in intimate compliance with the record surface, as required for efficient recording. Potentially obstructuve guiding elements between the selected record and others behind it are unnecessary.

The foregoing and other features, objectives and characteristics of the present invention will be more fully appreciated and understood from the following detailed description and claims.

DETAILED DESCRIPTION

Apparatus Configuration

Referring to FIGS. 1–8 subject apparatus comprises laminate disc pack sub-assembly 2, stabilizing members 4a, 4b and 4c, and access sub-assembly 6.

Disc Sub-assembly

Figures 3, 20, 21, 22:
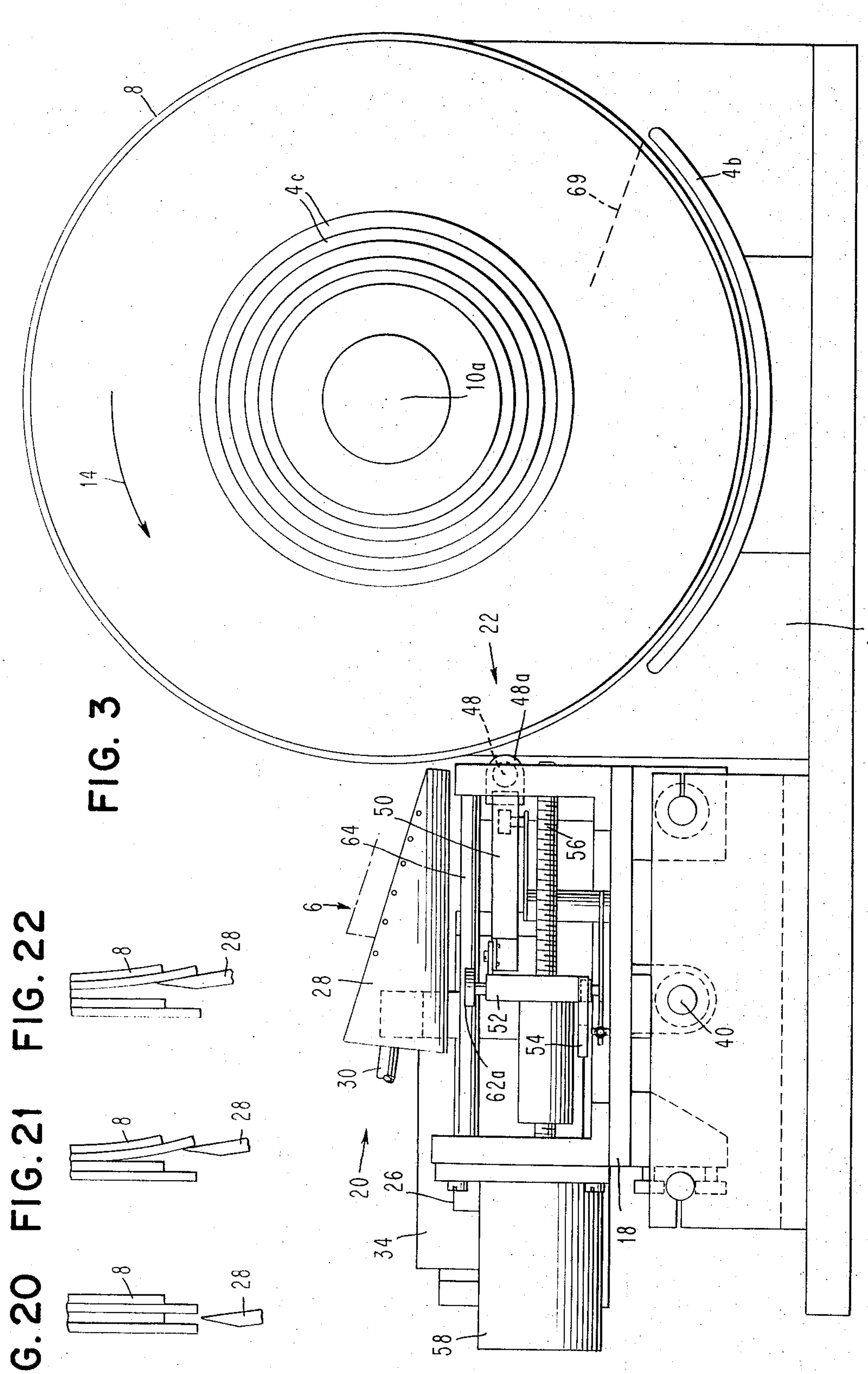
FIGS. 14–22 provide views of the partitioning blade and pack assembly useful for explaining blade motion.
Figures 4, 5, 9:
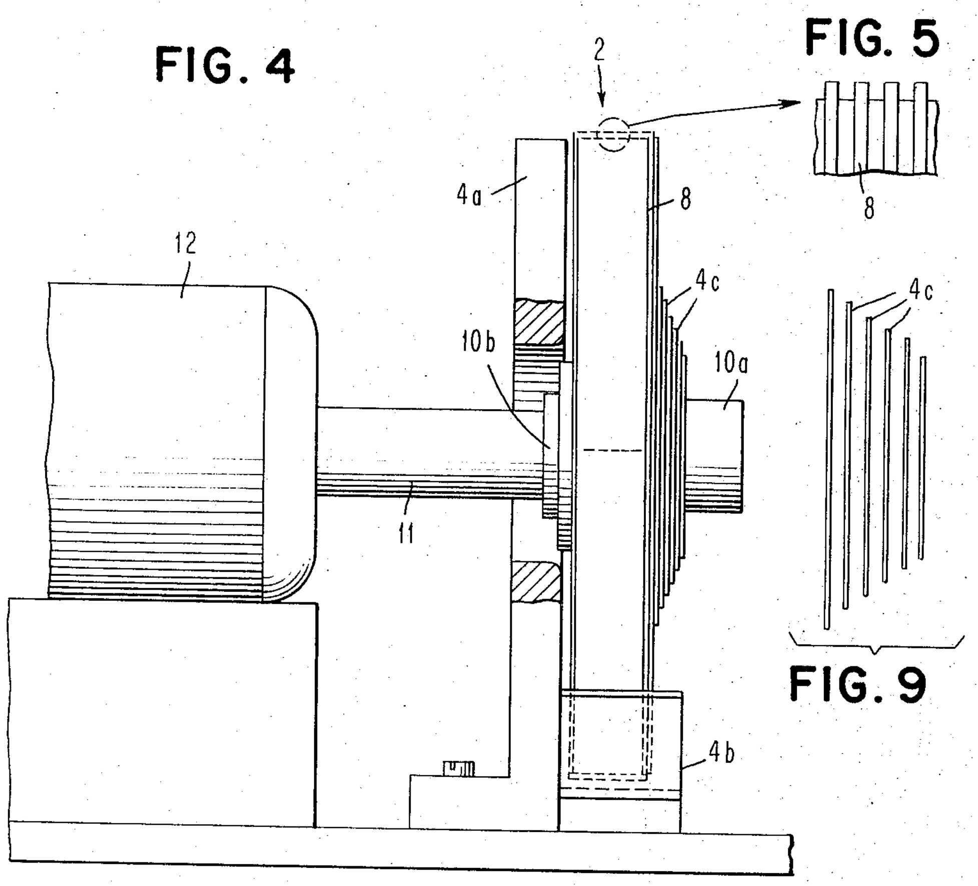
FIG. 4 illustrates the disc pack sub-assembly and stabilizing elements.
FIG. 5 illustrates the use of sheets having varied diameters for edge delineation to facilitate access location.
FIGS. 9–13 provide views of the pack assembly useful for explaining stabilization effects.

Pack 2 comprises several hundred ultra-thin (nominal thickness 0.0017 inches) vertically oriented flexible disc-shaped magnetic record foils 8 secured by clamps 10*a*, 10*b* (FIG. 4) to a horizontally oriented spindle which threads into horizontally oriented shaft 11. The shaft is driven by motor 12 (FIG. 4). The discs, which are free to bend beyond the periphery of the clamps 10*a*,10*b*, have nominal diameters of 12 inches; alternate discs being shortened slightly to 11.7 inches diameter (FIG. 5) to provide for edge discrimination by not shown edge locating apparatus. The discs are cut from webs of magnetic oxide coated mylar (mylar thickness in inches approximately 0.0015; oxide coating thickness approximately 0.0002). Shaft 11 is rotated by motor 12 continuously at high speed (approximately 1,800 rpm) in the direction indicated by arrow 14 (FIG. 3).

Access Sub-assembly (FIGS. 1–3, 6–8)

Access sub-assembly 6 comprises carriage 18, partitioning sub-assembly 20, transducing sub-assembly 22 and a not shown edge (interface) locating sub-assembly. The locating sub-assembly forms no part of the present invention and may be either of conventional construction, as described in the prior art references cited above, or of specialized improved construction as described in above-referenced co-pending patent application number 5 by R. O. Cobb and J. Lipp.

Partitioning Sub-assembly

Figure 1:
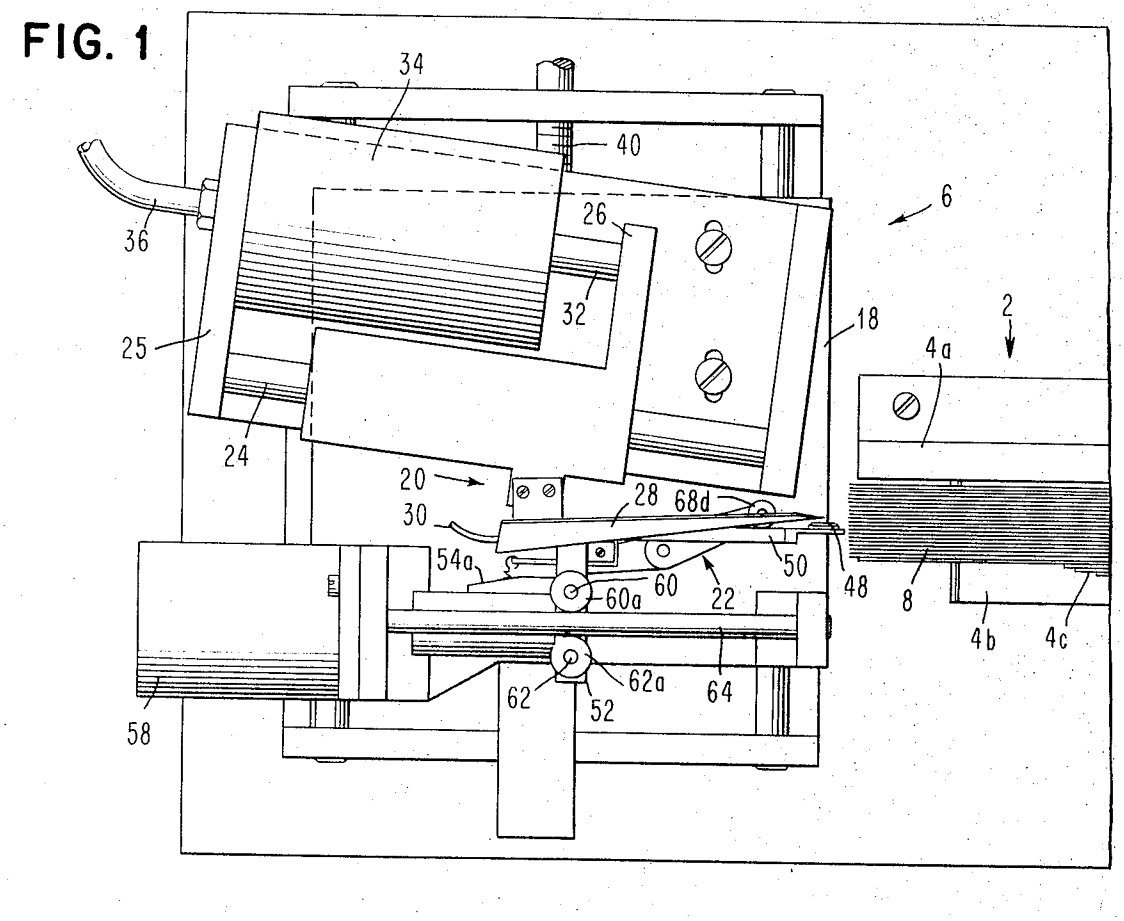
FIGS. 1–3 contain top, side and end elevational views of the subject apparatus.
Figures 6, 18, 19:
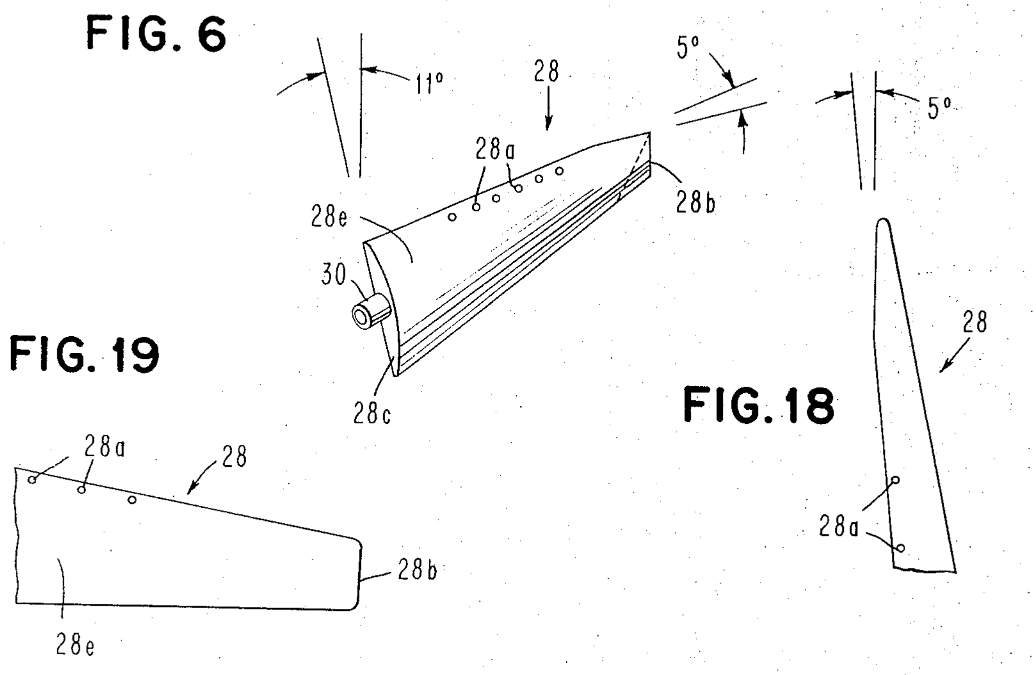
FIG. 6 illustrates the blade part of the partitioning sub-assembly.

Partitioning sub-assembly 20 comprises shaft 24 secured to chassis 25 which is fastened to carriage 18, base plate 26 slideable on shaft 24, and air foil blade 28 secured rigidly to plate 26. Blade 28 contains hollow passages 28*a* (FIGS. 1,6). These connect with tube 30 to conduct air under slight pressure, into partition opening spaces formed by the blade, with pack stabilization effects discussed later. Carriage 18 is movable longitudinally relative to pack 8 by rotation of screw 40; causable by not shown motive means. Plate 26 is movable toward and away from pack 8, in a direction oblique to the axis of screw 40, by actuation of piston rod 32 from pneumatic chamber 34. Admission of air under pressure to chamber 34 via tube 36 thrusts piston rod 32 outwardly extending blade 28 into contact with the rotating pack at the randomly selected disc interface. This partitions the path of revolution of the pack at the selected disc interface into discretely separated rotating segments (one deformed and the other not) which diverge and converge around the blade forming a sizable opening suitable for transducing access. Release of air from chamber 34 permits rod 32 to return, under the influence of a not shown spring, to a retracted position in which the blade is removed from partitioning engagement with the pack. In this position screw 40 is permitted to drive carriage 18 in traverse, under control of the above-mentioned edge locating assembly, to position blade 28 opposite another randomly selected interface whereupon the partitioning process may be repeated. The contours and motion of the blade, and damping effects of stabilizing elements discussed later, cause the partitioned pack to assume aerodynamically stable rotational configurations very shortly after initial contact with the blade (e.g. $200 \times 10^{-3}$ seconds).

Transducer Sub-assembly (FIGS. 1–3, 7,8)

Sub-assembly 22 (FIGS. 7,8) comprises magnetic head 44 encapsulated in ceramic support 46 having compound radius contours. Elements 44 and 46 operate as a low mass compliantly conformed gliding (or flying) shoe 48 relative to discs 8. For this purpose, the shoe is semi-rigidly suspended on an arm 50 comprising a pair of parallel cantilevered beam springs. Cross piece 52 connects arm 50 with carrier plate 54. As discussed below camming surface extension 54*a* of plate 54 controls pivoting of the shoe into conformal engagement with undeflected disc recording surfaces as the shoe is translated into the partition opening made by the blade. Plate 54 threads onto screw 56 which is driven rotationally by step motor 58. Posts 60,62 (FIGS. 1,2) extending from plate 54 carry respective rollers 60*a*, 62*a* which "ride" along stationary shaft 64 and serve to stabilize assembly 22 against rocking motion. When screw 56 is rotated by step motor 58, the transducing assembly of plates 52 and 54, arm 50 and shoe 48 is translated radially relative to the axis of pack 8 (i.e., towards and away from the discs); subject to constraints imposed on arm 50 by bell-crank assembly 68 discussed next. Bell crank assembly 68 (FIG. 7) which is stationary relative to assembly 52, 54, 50, 48, is tensioned counter-clockwise for rotation about post 68*a* by spring 68*b*. When shoe 48 is disengaged from the rotational volume traced by the discs (plates 52,54 at the extreme left as viewed in FIG. 7) the "high" surface of cam 54a prevents pivoting of assembly 68. However as plates 52,54 are extended to the right towards the pack (by step motor 58) roller 68*c* "follows" cam 54*a* enabling assembly 68 to pivot counterclockwise under the influence of spring 68*b*. Roller 68*d* thereby swings away from arm 50. Arm 50 is tensioned towards the undeflected segment (upwardly in FIG. 7) by the position of plate 52 relative to that segment. Therefore when it is released by the roller 68*d* shoe 48 swings from a position of clearance towards the undeflected discs. With suitable tensioning of arm 50 as discussed later shoe 48 assumes conformal gliding relationship to the facing surface of the undeflected segment as shown in FIG. 8 (also in phantom in FIG. 7) and as described particularly in above cross-referenced applications 3 and 4. Of interest are the uniform "dimpling" conformance of the disc surface of revolution to the head contour, the tight and constant spacing between shoe 48 and the opposed disc surface, and the tension on arm 50 requisite thereto.

Operation of Complete Apparatus

Figure 14:
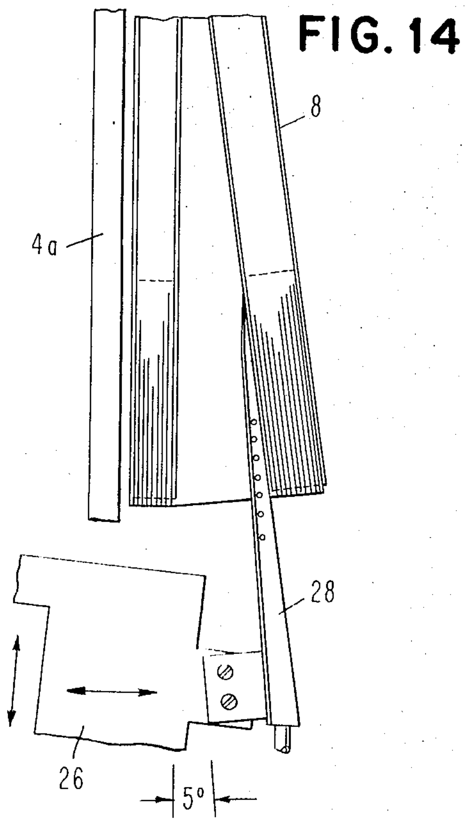
Figure 15:
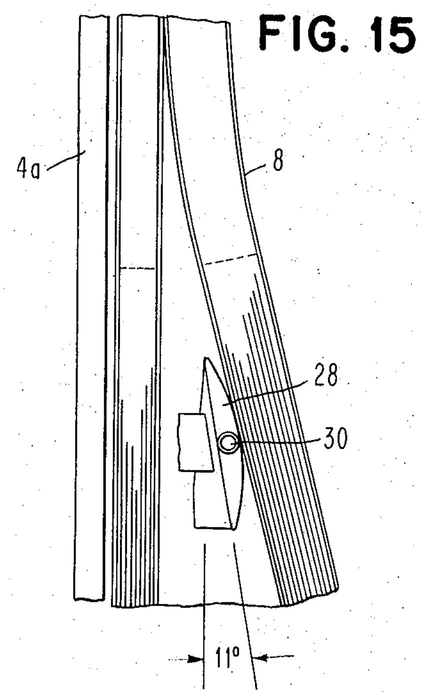

In operation sub-assemblies 20 and 22 are translated axially by carriage 18, in retracted (withdrawn) position relative to the rotational path of the discs. Upon alignment of the tip of blade 28 with the desired randomly selected disc interface, the path of rotation of the aggregate discs is partitioned by operation of assembly 20. Blade 28 is thrust deep into the rotational volume traced by the discs moving obliquely to one side (to the right as viewed in FIGS. 2, 14 and 15) until it aligns with chord 69 (FIG. 3). The gradually varying camber of the blade contour facing the deflected discs (the discs displaced by the skewed motion) forms a supportive hydrodynamic air film relative to these discs while gradually widening the space between deflected and undeflected discs. Due to operation of stabilizing elements discussed later, the partition configuration stabilizes quickly with the deflected discs gliding smoothly around the blade.

Upon stabilization of the partitioned discs, assembly 22 is actuated to extend shoe 48 radially into the partition space; at first in a position of clearance relative to the undeflected discs and then, by action of cam 54a and assembly 68, pivotally towards the interfacing undeflected disc surface representing the desired record. This positions the head at a peripheral zone or track of that surface. The pivotal tension on arm 50, adjusted to a predetermined condition as discussed later, enables the shoe to form a complementary contour (dimple) in the interfacing disc surface with an intervening lubricating air film of intimate dimensions between the shoe and that surface. From the above-mentioned peripheral zone the gliding (or flying) shoe advances radially, by continued operation of motor 58, to a randomly selected recording track position while continually maintaining the conformal relation to the record surface.

Stabilization (FIGS. 4, 9–13)

Stabilization of the rotating pack after partitioning requires damping of components contributing to flutter and other unstable motion characteristics. Referring to FIGS. 4 and 9–13, a series of flexible "washer discs" 4*c* adjacent the pack operate as a variable rate spring to damp the motion of the deflected segment of the pack (the portion deflected to the right as viewed in FIGS. 2 and 13–15). Washers 4*c* (FIGS. 4,9) have the following exemplary configuration of thickness, compositional construction and diameter listed in the order of increasing diameter, (i.e. as viewed from right to left in FIGS. 4 and 9):

| Qty. | | | | |
|---|---|---|---|---|
| 1 | .125" | Thick Alum. | 3.75" | Dia. |
| 2 | .0075" | Thick Mylar | 3.87" | do. |
| 2 | .0075" | do. | 4.12" | do. |
| 1 | .0075" | do. | 4.25" | do. |
| 1 | .0075" | do. | 4.50" | do. |
| 1 | .0075" | do. | 4.62" | do. |
| 1 | .0075" | do. | 4.75" | do. |
| 1 | .0075" | do. | 5.12" | do. |
| 1 | .0075" | do. | 5.94" | do. |
| 1 | .0075" | do. | 11.75" | do. |

A partial shroud 4*b* shown in FIGS. 3 and 4 spans an arcuate portion of between 90° to 105° of the cylinder of rotation traced by the pack. The end of the shroud furthest from the blade is substantially in line with the upper edge of the fully inserted blade and coincident with the extension of chord 69 (FIG. 3). The length of the shroud relative to the axis of the pack is sufficient to span the deflected and undeflected pack segments and thereby receive the full air flow of the partition space. The shroud controls this air flow and limits the tendency of the deflected segment of the pack to flutter relative to blade 28.

Stationary reference plate 4*a* (FIG. 4) serves to stabilize the aggregate pack motion. The grooves and connecting ducts in this plate (FIGS. 10 and 11) allow for the passage of entrapped air, between the plate and the nearest disc of the pack, with stabilizing effect.

The low pressure air conducted thru openings 28*a* in blade 28 (FIGS. 6, 18 and 19) serve to modify the air flow within the confined space between partitioned disc segments in a manner tending to counteract (i.e., damp) an observed fluttering tendency of discs in the undeflected segment.

Figure 13:
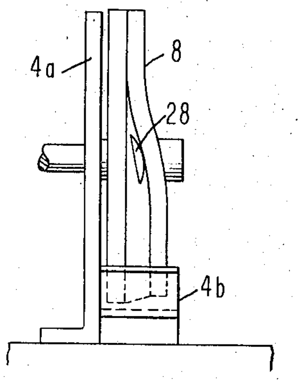
Figure 16:
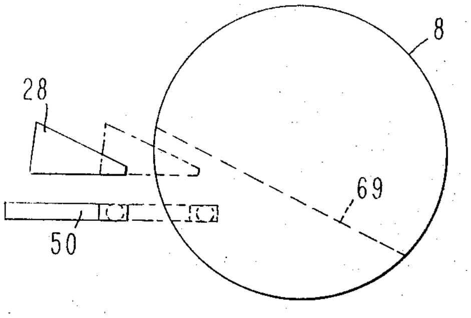
Figure 17:
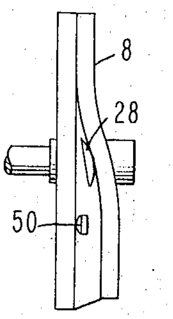

Thus, as blade 28 advances to its ultimate position of alignment with chord 69 (FIGS. 3,12) the path of motion of the deflected segment of discs is progressively deformed in conformance with and in compliant gliding relationship to the blade contours facing that segment (FIG. 13). The motion of the deflected and undeflected segments due to partitioning quickly stabilizes so that the axial position and shape of the partition space become sufficiently determinate to permit insertion of the transducing assembly without interference from the rotating discs.

Details of Blade Operations (FIGS. 6 and 12–22)

As suggested in FIG. 6, the contour of the blade from its tip 28*b* to its end 28*c* varies continuously to provide progressively varied cross sectional camber. This enables the blade to operate as an air foil or aircraft wing type structure while gradually deflecting and lubricatively supporting the partitioned pack. The openings 28*a* are angled to provide oblique air flow at a critical angle in the range 7°–11° from the vertical plane traced by the nearest undeflected disc. Base plate 26 supporting the blade moves at an oblique angle of approximately between 4° and 11° relative to the rotational plane of the nearest undeflected disc. Observations indicate that foregoing slewing angle range and blade contours, within stated limits, are critical to effecting quickly stabilized partitioning, with minimum wear and tearing stress on the selected discs.

FIGS. 20–22 indicate that in the present embodiment, of discs with staggered diameters providing edge delineation for the interface locating assembly, the blade invariably moves to deflect the larger diameter disc at the interface, permitting unambiguous positioning of the transducer adjacent surfaces of the shorter diameter discs as explained next.

Figure 2:
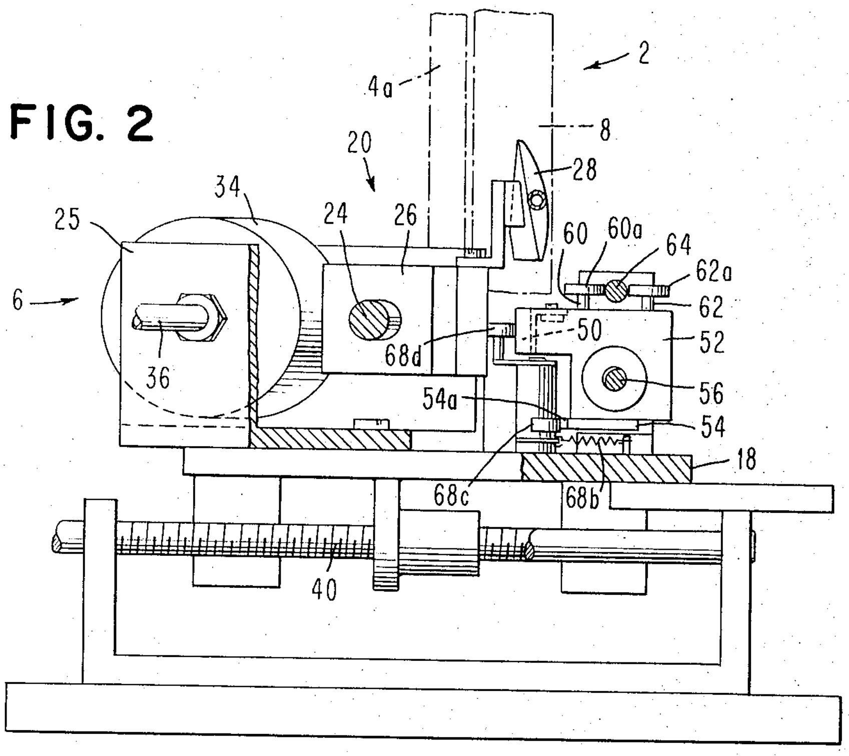
Figure 7:
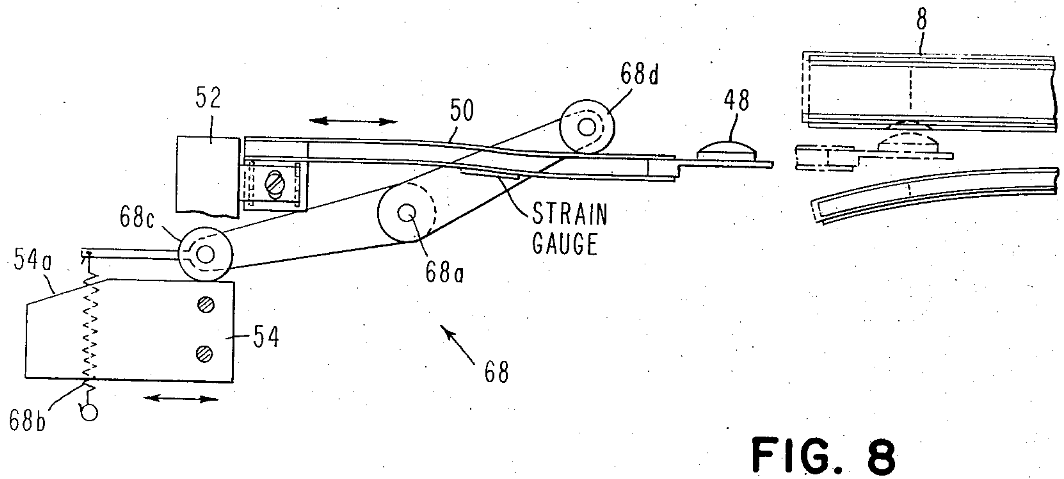
FIG. 7 illustrates the transducer sub-assembly.
Figure 8:
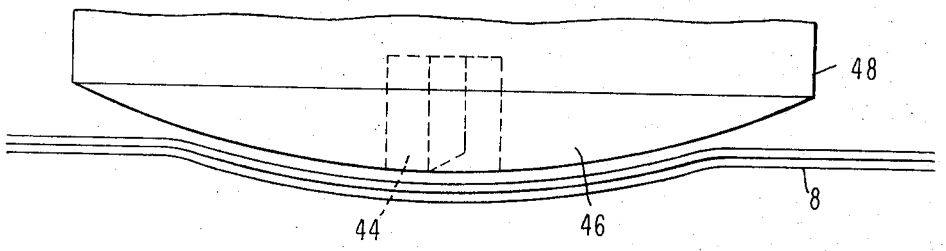
FIG. 8 illustrages the conformal relationship of the selected record surface and transducer contour.

Transducer Sub-assembly (FIGS. 2, 7–8)

Observations indicate that tensioning of arm 50 relative to the nearest disc surface of the undeflected segment is critical to providing uniform and close "dimpling" conformance between that (recording) surface and the contour of shoe 48 and therefore to providing suitable high density information transducing operation with low noise and without abrasion of the recording surface. The tension on arm 50 and shoe 48 is a function of the axial position of part 52 relative to the plane of rotation of the undeflected disc surface facing the partition opening. This position is preferably adjustable by allowing for manual adjustment of the axial position of partitioning assembly 20 relative to assembly 22 on carriage 18. One way this can be accomplished is to provide for adjustment parallel to the disc rotational axis of the position of assembly 20 relative to carriage 18; e.g., by allowing for clearance hole displacement of the screw and bolt assembly which fastens chassis 25 to the carriage 18 (e.g., over a clearance range equal to the thickness of several discs of the pack). Another way would be to provide clearance hole adjustment of the axial position of arm 50 at its connection with part 52 over a distance of several disc thicknesses.

For an exemplary compound radius head (spherical radii 3 inches at gap, 1 inch relief) on arms 3 inches in length which are formed of 0.010 inch thick spring steel, it has been found (by means of strain gauge indicated in FIG. 7) that a constant tensioning force of approximately 20 grams will produce a stable and constant relation of most intimate compliance between head and discs relative to discs in an undeflected segment of 20 or more discs. With less than 20 discs it has been found that the required tensioning force decreases in inverse proportion to the actual number of discs in the segment.

Consequently in the preferred and simplest mode of operation the first 20 discs of the undeflected segment closest to reference plate 4*a* are not used and the head tension is adjusted to the constant magnitude required for recording and reproducing on the other (several hundred) discs of the pack.

The dual arms 50 operate compensationally to maintain the head in a constant attitude relative to the recording surface as in FIG. 8. This is necessary for uniform recording and reproduction of data signals.

Shoe 48 and head 44 are constructed specifically as follows: ⅜ inch diameter shoe is formed with compound spherical radii of 3 inchs and 1 inch as above. The 3 inch spherical radius forms a circle of 3/16 inch with the w/r gap located at its geometric center. The remainder of the shoe is relieved with the 1 inch spherical radius.

The strain gauge (FIG. 7) is useful to provide signal feedback to establish initial manual adjustment of the head tension as explained above. Alternately, if desired, the transducing or partitioning assembly may be adapted for dynamic automatic fine-tuned positional adjustment relative to carriage 18, over a range of several disc thicknesses, during operation of the apparatus; with the strain gauge supplying the signals to control the positioning. This would permit variable tensioning of the head relative to the record surfaces whereby all discs (even the first 20) could be used and also permit the tension relative to the discs to be fine tuned automatically (e.g., hourly or daily) to provide optimized transducing efficiency with changing environmental conditions.

Dual Access

Figure 23:
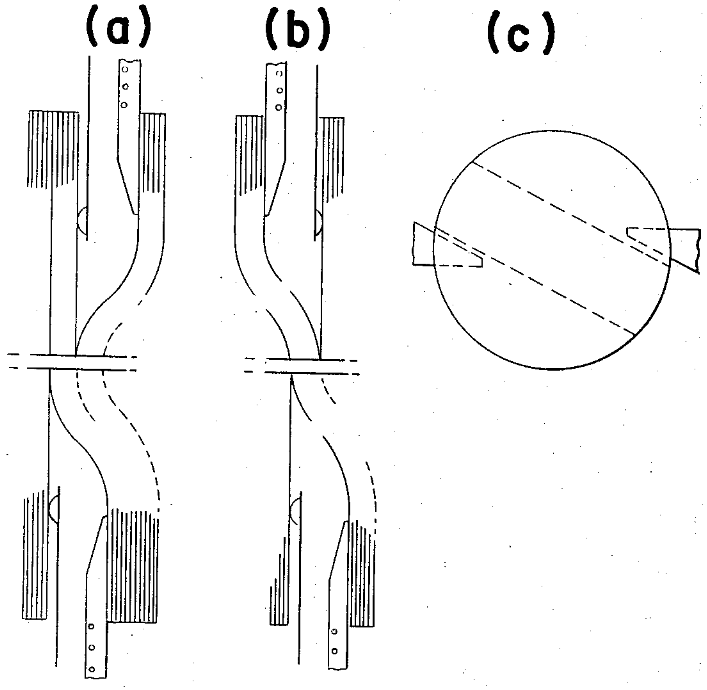
FIG. 23 comprised of *a, b* and *c* show a dual access configuration.

As indicated in FIG. 23 the present apparatus would be well suited to dual partitioning and transduction, either to permit one access assembly to serve as redundant back-up for another access assembly or to permit concurrent operation of two access assemblies.

FIG. 23(*a*) indicates that the two assemblies may operate relative to the undeflected segment of the pack in both the active/standby and concurrent modes of operation. Observe that in this configuration the dual access assemblies would be translated on separate carriages and the partitioning blades would be operable to enter the pack at the same or different positions.

FIG. 23(*b*) indicates that as an alternate configuration the partitioning blades may be oriented to operate in opposite deflecting directions relative to the pack to permit recording on both sides of the discs relative to undeflected segments.

Plural Packs

Figure 24:
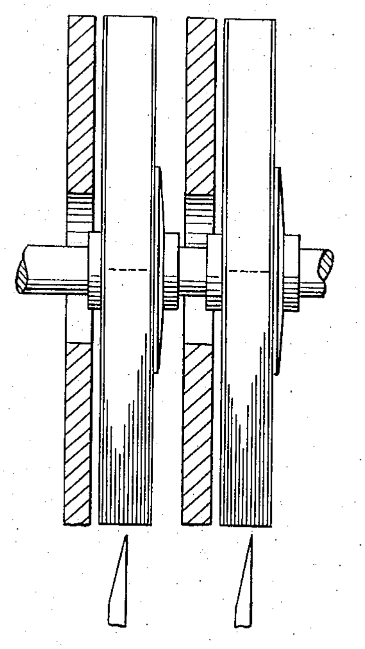
FIG. 24 shows plural disc packs aggregated on a common spindle.

FIG. 24 indicates that plural packs may be coaxially supported to access either individually by separate access assemblies or in common by a single access assembly. The access assemblies in the plural assembly version could be axially translated by clutch couplings between individual assemblies and a common drive train.

Recording on Deflected Segment

Figure 25:
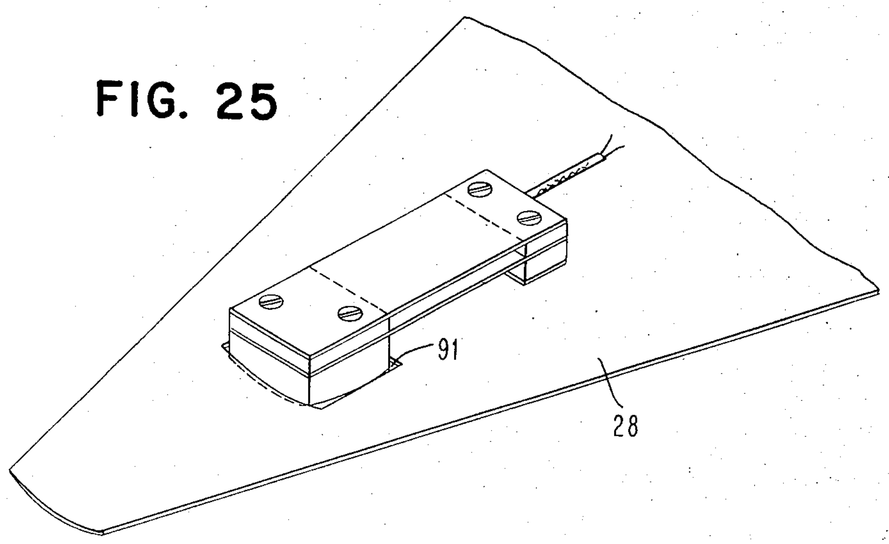
FIG. 25 shows an alternate access sub-assembly in which the head operates thru an opening in the blade.
Figure 10:
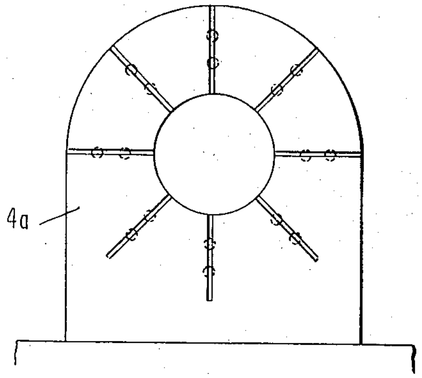
Figure 11:
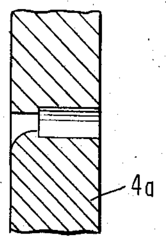
Figure 12:
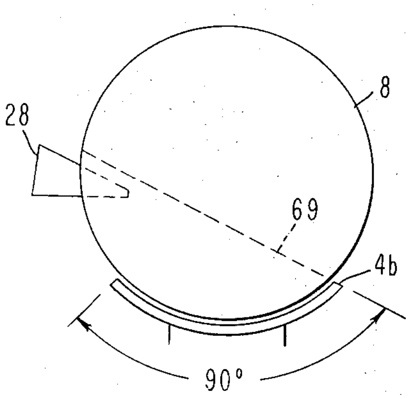

FIG. 25 indicates that the transducer assembly may be semi-rigidly suspended on the partitioning blade and operate relative to the deflected pack segment through a hole 91 in the blade. The blade would then be variably positioned along chord 69 to establish the "track" location of the head.

While the invention has been particularly shown and described with reference to a preferred embodiment thereof, it will be understood by those skilled in the art that various changes in form and detail may be made therein without departing from the spirit and scope of the invention.

What is claimed is:

1. In a random access data storage file, wherein access to a selected one of a multiplicity of continuously rotating freely flexible storage discs in a laminar configuration is effected by intermittent flexure of a corresponding selected segment of said configuration which partitions the rotational path of the aggregate configuration into two discrete segments of randomly variable thickness separated by a partition opening dimensioned to accommodate a separate transducer, access apparatus comprising:

means adapted for aerodynamically stabilized operation relative to said laminar configuration for effecting said partitioning with predetermined stabilization of the motion of the flexed and unflexed discs; and an independently suspended transducer assembly cooperative with said partitioning means to maneuver a contoured transducer into a conformal freely gliding position relative to a disc surface facing the opening created by said partitioning means without interferring contact between the transducer and the edge of the disc containing said facing surface.

2. Access apparatus according to claim 1 wherein said transducer contour is convex and a complementary concave contour is formed in said facing disc surface at its rotational interface with said head.

3. In a random access data storage file, wherein random access to individual discs in a laminar configuration of multiple continuously rotating flexible storage discs is effected by intermittent peripheral flexure of the discs serving to create partition openings at randomly selected disc interfaces, access apparatus comprising:

partitioning means operable relative to randomly selected said discs for effecting said intermittent flexure and for stabilizing the intermittent motion of the discs affected by said flexure within predetermined time after initiating said flexure; and transducing means semi-rigidly suspended relative to said partitioning means and positionable in coordination with said partitioning means relative to partition openings formed by said partitioning means; said transducing means arranged to be maneuverable into conformal freely gliding relation to disc surfaces facing said openings.

4. Access apparatus according to claim 3 wherein said partitioning means comprises a blade having distinctive airfoil contours and motion, the latter characterized by skewing movement at an oblique angle to the paths of revolution of the discs.

5. Access apparatus according to claim 3 comprising stabilizing members operatively associated with the rotating pack and said partitioning means for damping fluttering movements of the pack due to said flexure.

6. Access apparatus according to claim 3 wherein said discs are magnetic stores and said transducing means comprises a cantilevered beam spring suspension arm and a low mass contoured head suspended from said arm; said head contour tailored to produce said conformal relation by deforming said surface at its rotational interface with the head while permitting hydrodynamic formation of a lubricative intimately thin air film of stable form.

7. Access apparatus according to claim 6 wherein the transducing and positioning means are supported on a common carriage for axial translation relative to said discs and the axial positions of said means relative to each other on said carriage is adjustable over a small range for varying the tension of said arm relative to said facing disc surfaces.

8. Access apparatus according to claim 6 wherein said transducing means comprises means permitting movement of said head from external positions into said openings with the arm constrained to maintain clearance between the head and the facing disc surfaces and effective upon the head reaching a predetermined position within a said opening to release the constraints on said arm permitting said arm and head to swing towards said facing disc surface and construct said conformal relation.

9. Apparatus according to claim 6 wherein said head is subject to being extended into said opening with predetermined opposing tension and selectively removable constraint on said arm permitting the head to clear the edge of the facing disc without interference before assuming said conformal position.

10. Apparatus according to claim 3 wherein the discs are ultra-thin magnetically coated plastic foils and the transducing means includes a magnetic head with a nonmagnetic gap integrally incorporated in a smoothly contoured button-shaped shoe suited for establishing said conformal gliding positional relation to said facing disc surfaces with conformance over an area considerably larger than the area spanned by the non-magnetic gap.

11. In a random access disc file data storage system, in which a laminar aggregate configuration of multiple ultra-thin closely spaced flexible record discs is centrally clamped for continuous rotation as an integral pack unit, aerodynamically stable access apparatus comprising:

a rigidly suspended airfoil blade mounted for randomly selective intermittent partitioning movement between randomly selected said discs to produce stable clearance openings suitable for effecting transducing access to randomly positioned disc surfaces facing said openings;

a resiliently suspended low-mass transducer; and means coordinate with said intermittent blade movements for positioning said transducer in said clearance openings, in the wake of the confined air stream intercepted by the leading edge of the blade within said openings and in stable transducing relationship to said facing surfaces.

12. Apparatus according to claim 11 wherein said discs have annular recording zones and said blade is movable into the path of revolutioon of said zones in effecting said partitioning.

13. In a random access flexible disc storage file wherein a multiplicity of flexible storage discs arranged coaxially in a self-supporting laminer configuration are subjected to continuous rotation and to intermittent displacements at randomly selected lamination interfaces in order to provide intermittent transducing access to storage surfaces confronting openings created by said displacements the improvement comprising:

first apparatus effective to stabilize the motion of said discs upon each said displacement coactive with second apparatus effective to position a transducing head in conformal air lubricated relation to a said confronting surface rendered accessible by said displacement.

* * * * *